United States Patent
Murray

(10) Patent No.: US 12,116,899 B2
(45) Date of Patent: Oct. 15, 2024

(54) VARIABLE SPEED PUMPING SYSTEM WITH ELECTRIC PUMP MOTOR GENERATOR

(71) Applicant: ROLLS-ROYCE plc, London (GB)

(72) Inventor: Christopher A Murray, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/990,488

(22) Filed: Nov. 18, 2022

(65) Prior Publication Data
US 2023/0193776 A1 Jun. 22, 2023

(30) Foreign Application Priority Data
Dec. 17, 2021 (GB) .................... 2118357

(51) Int. Cl.
*F01D 15/08* (2006.01)
*F01D 15/10* (2006.01)

(52) U.S. Cl.
CPC ............ *F01D 15/08* (2013.01); *F01D 15/10* (2013.01); *F05D 2220/323* (2013.01); *F05D 2260/4023* (2013.01); *F05D 2260/60* (2013.01)

(58) Field of Classification Search
CPC .... F01D 15/08; F01D 15/10; F05D 2220/323; F05D 2260/4023; F05D 2260/60; F05D 2220/76; F05D 2260/40311; F05D 2260/98; B64C 13/40; F04D 13/06; F04D 13/021; F04D 13/04; F04D 15/0066
See application file for complete search history.

(56) References Cited

U.S. PATENT DOCUMENTS

| | | | | |
|---|---|---|---|---|
| 4,900,231 A | * | 2/1990 | Kennedy | B64D 41/00 417/16 |
| 10,174,760 B2 | | 1/2019 | Brookes et al. | |
| 2006/0012179 A1 | * | 1/2006 | Thomson | F02C 7/275 290/34 |
| 2015/0311841 A1 | * | 10/2015 | Palfreyman | H02P 9/02 322/15 |

(Continued)

FOREIGN PATENT DOCUMENTS

| | | |
|---|---|---|
| CN | 108105065 A | 6/2018 |
| EP | 0 247 641 A2 | 12/1987 |

(Continued)

OTHER PUBLICATIONS

Jun. 10, 2022 Office Action and Search Report issued in British Patent Application No. 2118357.9.

(Continued)

*Primary Examiner* — J. Todd Newton
(74) *Attorney, Agent, or Firm* — Oliff PLC

(57) ABSTRACT

A variable speed pumping system, for an aircraft, comprising: a first electrical machine, the first electrical machine comprising an electrical machine rotor shaft mechanically connected to an engine of the aircraft and electrical machine stator coils; an electric pump motor-generator, the electric pump motor-generator comprising an electric pump rotor shaft mechanically connected to the electrical machine rotor shaft via a one way drive arrangement and electric pump stator coils; wherein the electric pump rotor shaft is mechanically connected to a fluid pumping system.

13 Claims, 6 Drawing Sheets

(56) References Cited

U.S. PATENT DOCUMENTS

| | | |
|---|---|---|
| 2019/0017443 A1 | 1/2019 | Eifert |
| 2020/0291819 A1 | 9/2020 | Sethi et al. |
| 2021/0172334 A1 | 6/2021 | Brookes |

FOREIGN PATENT DOCUMENTS

| | | | |
|---|---|---|---|
| EP | 3912912 A1 * | 11/2021 | ............. B64D 13/02 |
| GB | 2 570 475 A | 7/2019 | |

OTHER PUBLICATIONS

May 11, 2023 Extended Search Report issued in European Patent Application No. 22208690.2.

* cited by examiner

VARIABLE SPEED PUMPING SYSTEM WITH ELECTRIC PUMP MOTOR GENERATOR

CROSS-REFERENCE TO RELATED APPLICATIONS

This specification is based upon and claims the benefit of priority from United Kingdom Patent Application No. 2118357.9, filed on 17 Dec. 2021, the entire contents of which are incorporated herein by reference.

TECHNICAL FIELD

This disclosure concerns pumping systems for aircraft, and more specifically concerns variable speed pumping systems for aircraft. The disclosure also concerns aircraft having pumping systems and methods of operating pumping systems. The disclosure also concerns blower systems for supplying air to aircraft systems.

BACKGROUND

Pumping systems are used in aircraft to pump a variety of fluids including oils and fuel. Such pumping systems may be mechanically driven or electrically driven.

Mechanical pumping systems may have pumping pressures and flow rates constrained by the mechanical drive input conditions from an external system, such as an engine of the aircraft. It is not possible to turn the pump any faster than the engine is driving it, without accelerating the engine, and this limits the pressures that can be generated and the flow rates that can be passed through the system. The wider engine systems must be designed cognisant of these constraints.

Electric pumping systems are prone to pumping failures due to electrical drive system and coil arrangement failures. Additionally, to drive an accessory such as a pumping element from an engine of an aircraft fully electrically, that electrical power first has to be generated from chemical energy in the fuel which undergoes conversion to mechanical shaft energy, to then go through an energy conversion to electrical energy, to then go through a further energy conversion to mechanical energy to turn the pumping element at the desired speed. Every energy conversion involves efficiency losses. It would be beneficial to reduce the number of energy conversions, and to reduce the magnitude of those energy conversions needed in the system.

SUMMARY

According to a first aspect, there is provided a variable speed pumping system, for an aircraft, comprising: a first electrical machine comprising an electrical machine rotor shaft mechanically couplable to a shaft of an engine of the aircraft and electrical machine stator coils; an electric pump motor-generator, the electric pump motor-generator comprising an electric pump rotor shaft mechanically connected to the electrical machine rotor shaft via a one way drive arrangement and electric pump stator coils; wherein the electric pump rotor shaft is mechanically connected to a fluid pumping system.

The fluid pumping system may be suitable to pump any suitable fluid, which may incompressible (e.g. a liquid) or compressible (e.g. a gas), such as, for example, fuel, hydraulic fluids, oil or coolants.

The variable speed pumping system may be connected to a power management system (i.e. an electrical power system). The power management system may be operable to transfer electrical power to or receive electrical power from the stator coils of the first electrical machine and the stator coils of the electric pump motor-generator. The power management system may include a storage device such as a battery or a capacitor configured to store electrical power. The variable speed pumping system including the power management system, if present, may form part of a wider system, such as a blower system (e.g. cabin blower system), for example.

The one-way drive arrangement may be configured such that the electrical machine rotor shaft and the electric pump rotor shaft can rotate relative to each other in only one direction. The one-way drive arrangement may be configured such that the electrical machine rotor shaft can only drive the electric pump rotor shaft in one direction, whilst providing minimal resistance to relative rotation in the other direction.

Any suitable one-way drive arrangement may be used such as, for example, a sprag clutch arrangement or a ratchet and pawl arrangement.

The fluid pumping system may comprise any suitable type of pump, for example, a gear pump, a vane pump, a gerotor pump, a centrifugal pump, a piston pump or a compressor (e.g. a centrifugal compressor, an axi-centrifugal compressor or a scroll compressor).

The electric pump rotor shaft may be mechanically connected to a fluid pumping system via a geared arrangement. For example, the electric pump rotor shaft may comprise a gear wheel arranged to interengage with a further gear wheel. The gear wheel of the electric pump rotor shaft and further gear wheel may comprise a plurality of teeth configured to interengage such that rotation of the gear wheel may cause rotation of the further gear wheel. Any suitable number of further gear wheels may be mechanically connected to the gear wheel and/or any further gear wheels present.

The gear wheel of the electric pump rotor shaft and/or the further gear wheel may be mechanically connected to a remote fluid pumping system such that the gear wheel and/or further gear wheel may provide mechanical power to the remote pumping system.

The gear wheel of the electric pump rotor shaft and/or the further gear wheel may directly form part of a fluid pumping system such as a positive displacement gear pump assembly.

The first electrical machine may be any suitable type of electrical machine. Likewise, the electric pump motor-generator may be any suitable type of electrical machine and may the same type or a different of electrical machine to the first electrical machine. In one specific embodiment, one or both of the electrical machines are permanent magnet electrical machines with stator coils arranged to at least partially surround a portion of the rotor shaft. However other types and configurations are possible, including outrunner radial flux machines, axial flux machines, transverse flux machines, switched reluctance machine and wound-field machines, and other machine types and configurations which will occur to those skilled in the art.

In a first mode, the electrical machine rotor shaft may be mechanically rotated by power received from the engine. The electrical machine rotor shaft may be mechanically connected to the engine through an accessory gearbox, for example. Rotation of the electrical machine rotor shaft may drive rotation of the electric pump rotor shaft via the one-way drive arrangement.

Rotation of the electrical machine rotor shaft by the engine may allow for electrical power generation through the electrical machine stator coils. In this way, in the first mode, the first electrical machine may be configured to operate as a generator. The electrical power generated by the first electrical machine may then be used by other electrically connected systems. The electrical power generated by the first electrical machine may be transmitted to the power management system.

Rotation of the electric pump rotor shaft by the electrical machine rotor shaft via the one-way drive arrangement may allow for electrical power generation through the electric pump stator coils. In this way, in the first mode, the electric pump motor-generator may be configured to operate as a generator. The electrical power generated by the electric pump motor-generator may then be used by other electrically connected systems. The electrical power generated by the electric pump motor-generator may be transmitted to the power management system.

Rotation of the electric pump rotor shaft by the electrical machine rotor shaft via the one-way drive arrangement may drive the fluid pumping system. In the first mode, the speed of the electric pump rotor shaft may be dictated by the speed of the electrical machine rotor shaft.

As such, in the first mode, the first electric machine and electric pump motor-generator may both be operated as generators. In the first mode, both the electric machine rotor shaft and electric pump rotor shaft may be mechanically driven.

In some circumstances, it may be beneficial for the electric pump rotor shaft to turn faster than the electrical machine rotor shaft.

In a second mode, the electrical machine rotor shaft may be mechanically rotated by power received from the engine.

Rotation of the electrical machine rotor shaft by the engine may allow for electrical power generation through the electrical machine stator coils. In this way, in the second mode, the first electrical machine may be configured to operate as a generator. The electrical power generated by the first electrical machine may then be used by other electrically connected systems. The electrical power generated by the first electrical machine may be transmitted to the or a power management system.

In the second mode, the electric pump motor-generator may be configured to operate as a motor. Electrical power from the power management system may be transmitted to the electric pump stator coils, in order to operate the electric pump motor-generator as a motor and not as a generator.

When operating as a motor, the electric pump motor-generator may be operable to cause the electric pump rotor shaft to overrun the first electric machine rotor shaft and therefore rotate faster than the first electric machine rotor shaft. In the second mode, the electric pump rotor shaft may be rotated electrically and may drive the fluid pumping system. As such, the electric pump rotor shaft may rotate at a speed that is not limited by the speed of rotation of the electrical machine rotor shaft.

The electric pump motor-generator, when run as a motor, may be configured such that the electric pump motor-generator is operable to electrically rotate the electric pump rotor shaft at variable speeds. In this way, the fluid pumping system may be driven to meet demand where the electrical machine rotor shaft is not rotating fast enough to meet said demand.

The variable speed pumping system may be operable to switch between the first mode and the second mode. Switching between the first mode and the second mode may be dependent on a variety of factors such as, for example, engine speeds and fluid pumping system demands.

The second mode may be used during, for example, starting the engine. During a starting mode of the engine, the first electrical machine may be operated as a generator. During a starting mode of the engine, the electrical machine rotor shaft may be rotating relatively slowly, but may be generating a lot of heat, because it may not be designed to be efficient in these operating conditions. In the second mode, the electric pump motor-generator may be operated as a motor to overrun the one-way drive arrangement to the desired rotation speed, which may provide the pumping of sufficient pumping fluid (e.g. oil) around the circuit to provide adequate cooling to the coils and rotors of the first electrical machine and/or the electric pump motor-generator.

The variable speed pumping system may be configured to switch from the first mode to the second mode at any suitable time during operation. The variable speed pumping system may be configured to switch from the first mode to the second mode when additional pumping flow rates or pumping pressures are required. Such conditions may include when greater flow rates of cooling fluids, such as oil, are required.

By providing a means for increasing the flow of cooling fluids the rates of temperature change experienced by components, such as components in one or more oil cooling circuits, may be reduced.

In a third mode, the electrical machine rotor shaft may be driven electrically. The electric motor stator coils may receive power from the or a power management system which may cause the first electrical machine to operate as a motor. The electrical machine rotor shaft may be used as the prime mover to turn the accessory gearbox.

The third mode may be used at engine start up. In the third mode, the first electrical machine operating as a motor may only rotate the electrical machine rotor shaft relatively slowly. This in turn may only mechanically rotate the electric pump rotor shaft relatively slowly via the one-way drive arrangement.

As such, in the third mode, the electric pump motor-generator may be configured to also operate as a motor. Electrical power from the or a power management system may be transmitted to the electric pump stator coils in order to operate the electric pump motor-generator as a motor.

When operating as a motor, the electric pump motor-generator may be operable to cause the electric pump rotor shaft to overrun the first electric machine rotor shaft and therefore rotate faster than the first electric machine rotor shaft. In the third mode, the electric pump rotor shaft may be rotated electrically and may drive the fluid pumping system. As such, the electric pump rotor shaft may rotate at a speed that is not limited by the speed of rotation of the electrical machine rotor shaft.

The electric pump motor-generator, when run as a motor, may be configured such that the electric pump motor-generator is operable to electrically rotate the electric pump at variable speeds. In this way, the fluid pumping system may be driven to meet demand where the electrical machine rotor shaft is not rotating fast enough to meet said demand.

The variable speed pumping system may be operable to switch between the first mode, the second mode and/or the third mode. Switching between the first mode, the second mode and/or the third mode may be dependent on a variety of factors such as, for example, engine speeds and fluid pumping system demands.

In the third mode, the first electric machine and the electric pump motor-generator may both be configured to operate as motors and both the electric machine rotor shaft and the electric pump rotor shaft may be electrically driven.

The third mode may be used during, for example, barring of the engine. During barring of the engine, the first electrical machine may be operated as a motor. When operated as a motor the electrical machine rotor shaft may be rotating relatively slowly but may be generating a lot of heat, because it may not be designed to be efficient in these operating conditions. In the third mode, the electric pump motor-generator may be operated as a motor to overrun the one-way drive arrangement to the desired rotation speed, which may provide the pumping of sufficient pumping fluid (e.g. oil) around the circuit to provide adequate cooling to the coils and rotors of the first electrical machine and/or the electric pump motor-generator.

Upon loss of electrical power to the electric pump motor-generator the pump may remain operational through its mechanical drive mechanism.

According to a second aspect, there is provided a blower system for supplying air to an aircraft system, comprising: a blower compressor for compressing air for delivery to an aircraft system; a transmission having an input mechanically couplable, e.g. mechanically coupled, with a gas turbine engine spool and an output mechanically coupled with the air compressor; wherein the transmission comprises: an electrical machine comprising an electrical machine rotor shaft mechanically couplable to the spool of the gas turbine engine and electrical machine stator coils; and an electric pump motor-generator comprising an electric pump rotor shaft mechanically connected to the electrical machine rotor shaft via a one way drive arrangement and electric pump stator coils; wherein the electric pump rotor shaft is mechanically connected to a fluid pumping system.

The blower system may be configured to supply air to an aircraft system for one or more pressurisation purposes. The pressurisation purposes may include, for example, wing anti-icing, fuel tank inerting, cargo bay smoke eradication and/or aircraft cabin pressurisation. If the blower system is configured to supply air for aircraft cabin pressurisation, it may be referred to as a cabin blower system.

The transmission may comprise a continuously variable transmission (CVT).

The transmission may be configured to receive mechanical power from the spool of the gas turbine engine in the form of a first transmission input.

The blower system may comprise: an electrical circuit comprising the first electrical machine; a second electrical machine; and a power management system, wherein, when operating in a blower mode, the first electrical machine is configured to receive mechanical power from the spool of the gas turbine engine and act as a generator to provide electrical power to the power management system, and the second electrical machine is configured to act as a motor providing mechanical power to the transmission in the form of a second transmission input, the second electrical machine being driven by electrical power from the power management system.

An output of the transmission may be configured to drive the blower compressor when operating in the blower mode, a speed of the output of the transmission being determined by a function of a speed of the first and second transmission inputs.

The blower system may further have an engine starting mode. In the engine starting mode the transmission may be configured to drive rotation of the spool of the gas turbine engine via the first transmission input. In this case the transmission may be driven to rotate by the blower compressor, which may be operated as an air turbine using a supply of pressurised air (e.g. from ground equipment or an auxiliary power unit as is known in the art). Additionally or alternatively, the first electrical machine may be configured to operate as a motor to drive rotation of the spool of the gas turbine engine.

The blower system may further comprise a disconnect arrangement for selectively disconnecting the blower compressor from the spool of the gas turbine engine. The disconnect arrangement, or one or more additional disconnect arrangements, may additionally or alternatively connect the transmission and/or variator from the gas turbine engine. Providing a disconnect arrangement, for example a clutch arrangement or an electro-mechanical disconnect arrangement, allows isolation of blower system components in case of faults or operational issues.

The transmission may be a summing gearbox, and may be a summing epicyclic gearbox.

According to a third aspect there is provided a gas turbine engine comprising a variable speed pumping system according to the first aspect or a blower system according to the second aspect.

According to a fourth aspect there is provided an aircraft comprising a variable speed pumping system according to the first aspect, a blower system according to the second aspect, or a gas turbine engine according to a third aspect.

As noted elsewhere herein, the present disclosure may relate to a gas turbine engine. Such a gas turbine engine may comprise an engine core comprising a turbine, a combustor, a compressor, and a core shaft connecting the turbine to the compressor.

Such a gas turbine engine may comprise a fan (having fan blades) located upstream of the engine core.

Arrangements of the present disclosure may be particularly, although not exclusively, beneficial for fans that are driven via a gearbox.

Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

The person skilled in the art will appreciate that except where mutually exclusive, a feature described in relation to any one of the above aspects may be applied mutatis mutandis to any other aspect.

Furthermore except where mutually exclusive any feature described herein may be applied to any aspect and/or combined with any other feature described herein.

BRIEF DESCRIPTION OF THE DRAWINGS

Examples are described below with reference to the accompanying drawings, in which.

DETAILED DESCRIPTION

Figure 1:
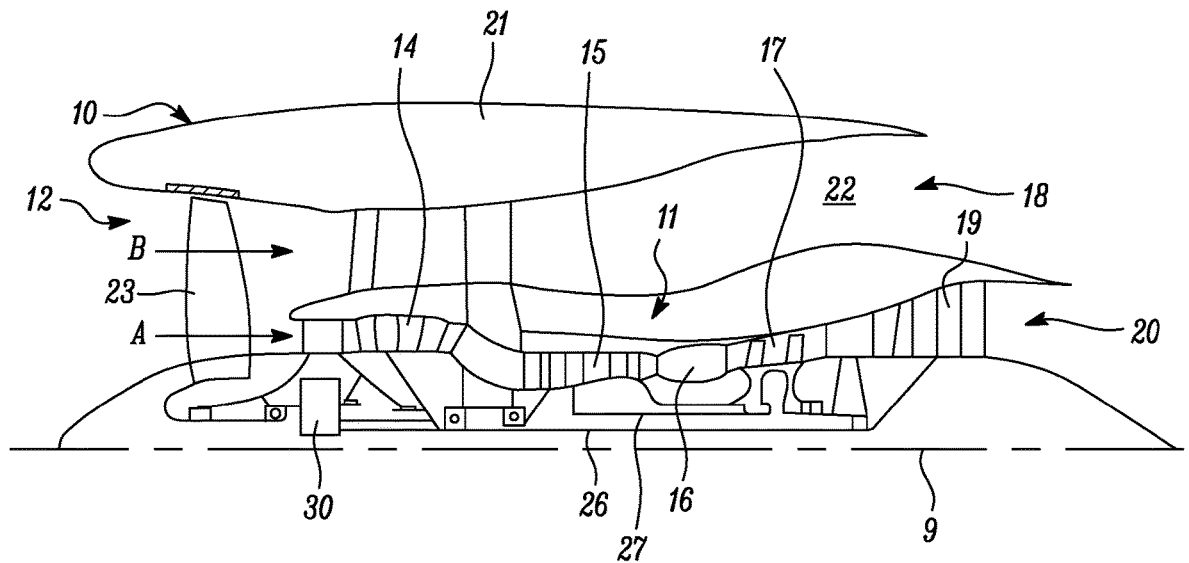
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high-pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
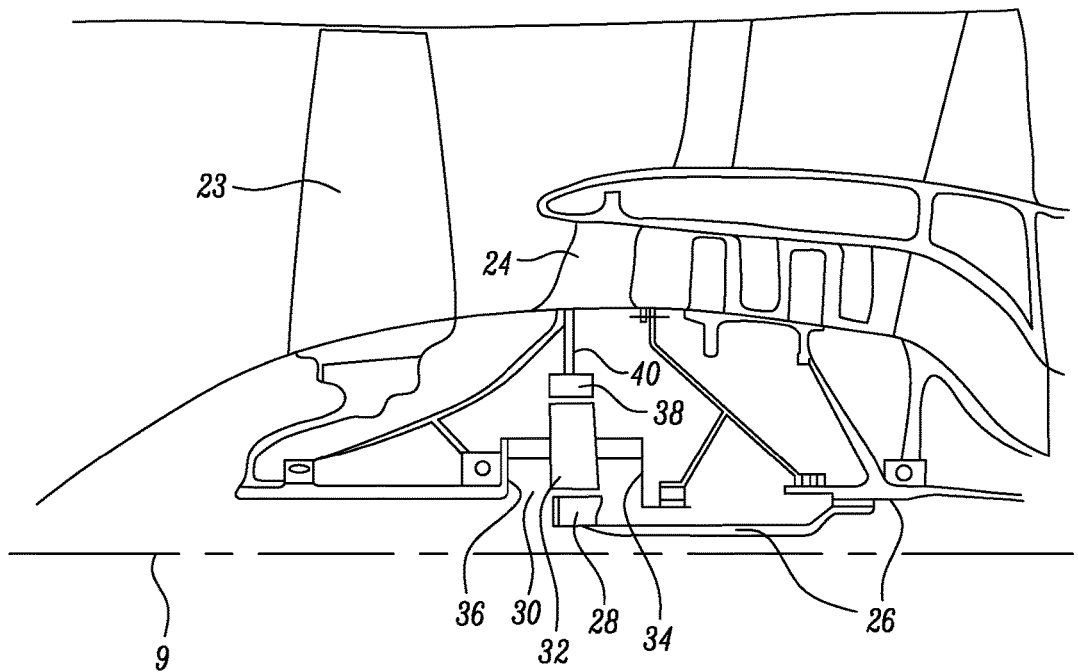
FIG. 2 is a close-up sectional side up view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low-pressure turbine" and "low-pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low-pressure turbine" and "low-pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
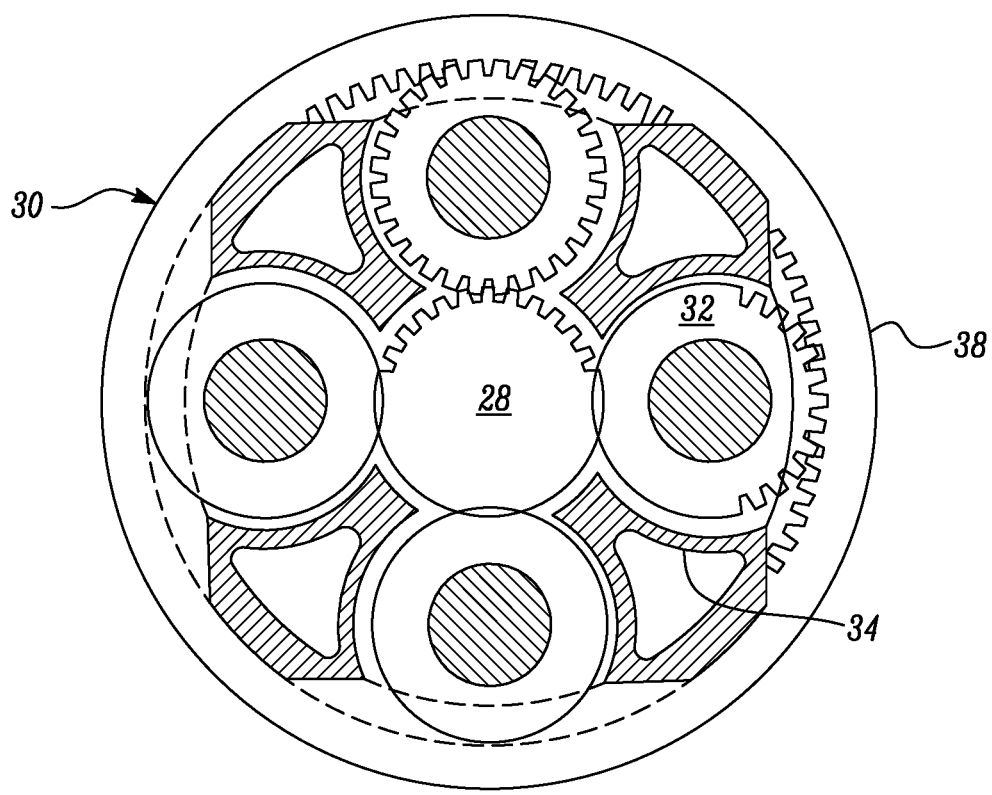
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10.

By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
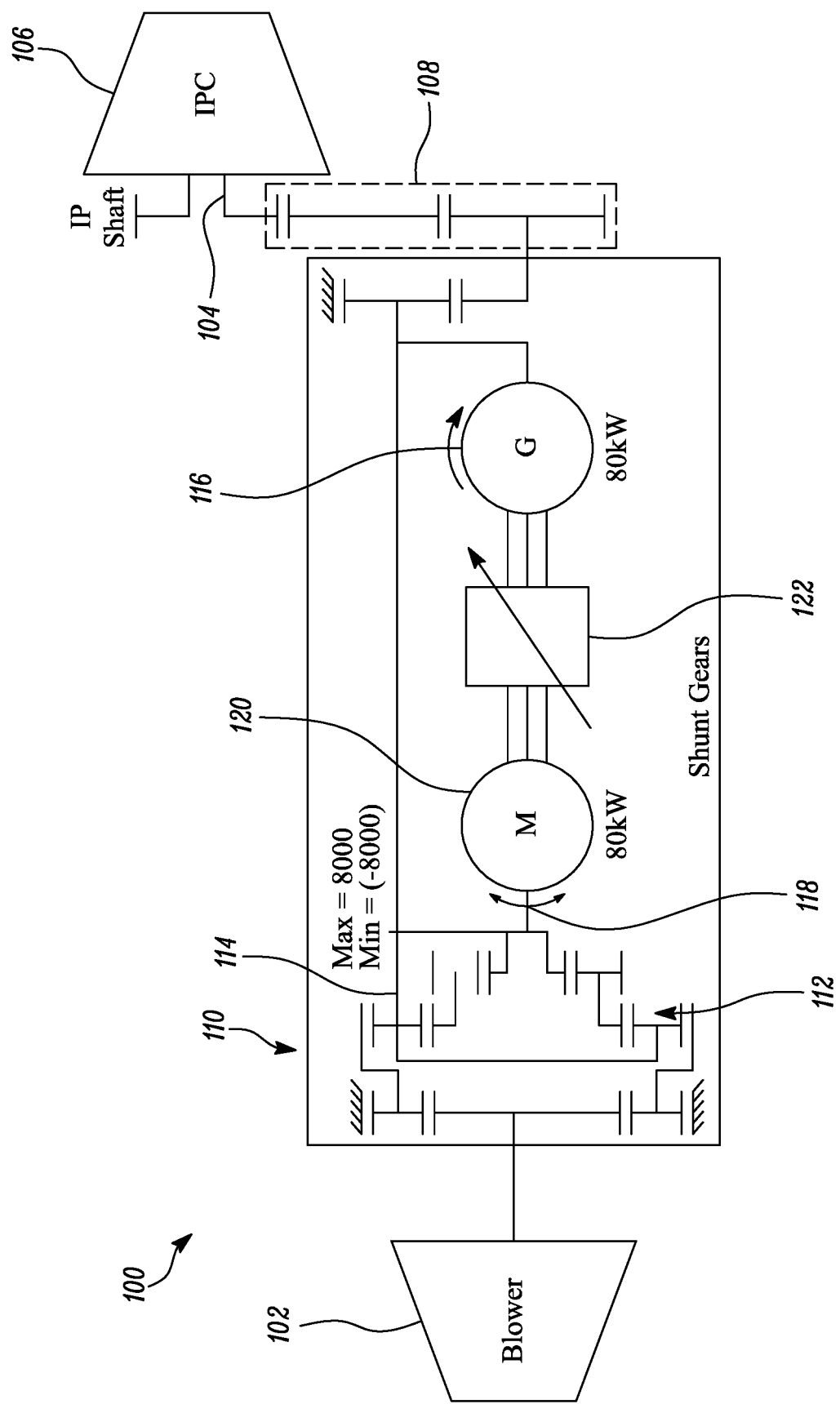
FIG. 4 is a schematic view a blower system.

Referring now to FIG. 4, an example of an aircraft blower system 100 is shown in schematic form. The blower system 100 is configured to supply air to one or more aircraft systems for one or more pressurisation purposes. The pressurisation purposes may include, for example, wing anti-icing, fuel tank inerting, cargo bay smoke eradication and/or aircraft cabin pressurisation. If the blower system is configured to supply air for aircraft cabin pressurisation, it may be referred to as a cabin blower system. In the following description the blower system 100 will be referred to as a cabin blower system, though it should be understood this is not intended to be limiting.

The cabin blower system 100 includes a cabin blower compressor 102 and a power source, which in this specific example is in the form of an intermediate-pressure shaft 104 of an intermediate-pressure compressor 106 of a gas turbine engine. The intermediate-pressure compressor 106 powers an accessory gearbox 108 of the gas turbine engine, which, in turn, provides power to a transmission 110 of the cabin blower system 100. The accessory gearbox 108 may however be powered by the low-pressure shaft, intermediate-pressure shaft, or the high-pressure shaft of any gas turbine engine.

The transmission 110 comprises a summing epicyclic gearbox 112 with two inputs. A first transmission input 114 of the epicyclic gearbox 112 is provided mechanically from the accessory gearbox 108 to a part of the epicyclic gearbox 112. The accessory gearbox 108 also provides mechanical power to a first electrical machine 116 which, in a blower mode of the cabin blower system 100, operates as a generator to convert the mechanical power received from the accessory gearbox 108 to electrical power. A second transmission input 118 of the epicyclic gearbox 112 is provided from a second electrical machine 120 which, in the blower mode of the cabin blower system 100, operates as a motor to convert electrical power to mechanical power, which is provided to the epicyclic gearbox 112.

A power management system 122 interconnects the first electrical machine 116 and second electrical machine 120. In the blower mode being described here, the power management system 122 receives electrical power from the first electrical machine 116 and sends said power to the second electrical machine 120. Thus, despite in this embodiment both the first electrical machine 116 and the second electrical machine 120 being 80 kW motor-generators, the second electrical machine 120 can be driven as a motor at a different speed from the speed of the first electrical machine 116 acting as a generator at that time. Moreover, the power management system 122 can provide a continuously-variable difference between the power received from the first electrical machine 116 and the power output to the second electrical machine 120. It should be appreciated that the power outputs of the electrical machines can differ from 80 kW and will depend on the application requirements. Furthermore, the power outputs of the first and second electrical machines 116, 120 can be different.

The power management system can include electrical storage, in the form for example of one or more batteries, capacitors or similar, that enables the power management system to output more power than is being received by the power management system at any moment.

The epicyclic gearbox 112, as previously mentioned, is a summing epicyclic gearbox configured to have an output that is a function of the speeds of the first input 114 and the second input 118. In the present embodiment, the first input 114 is always positive, resulting in operation of the compressor 102. The second input 118, which can be rotated either positively or negatively by the second electrical machine 120, acts to provide either a positive or negative input to the epicyclic gearbox 112. Thus, the output of the epicyclic gearbox 112 that feeds to the compressor 102 can be adjusted continuously by the operation of the second electrical machine 120 such that the output is greater or less than that which would be provided were the only input to the epicyclic gearbox 112 to be the first input 114. The function of the epicyclic gearbox 112 may result in the output being the sum of the first and second inputs 114, 118 or may otherwise be related to the difference by way of a ratio provided by the epicyclic gearbox 112, for example.

The operation of a summing epicyclic gearbox 112 will be known to the person skilled in the art and therefore alternative implementations will be apparent. Moreover, other forms of summing gearbox may also be used, in addition to or as a replacement for the epicyclic gearbox 112 depicted.

In addition to operation in the blower mode, the cabin blower system 100 can also be operated in a starter mode in order to provide mechanical input to the gas turbine engine to facilitate a start operation of the gas turbine engine. The cabin blower compressor 102 can operate in reverse as an expander to provide drive to the epicyclic gearbox 112 from a supply of compressed air.

The second electrical machine 120 can then be held still such that the transmission 110 transmits the mechanical power from the compressor 102 to the accessory gearbox 108. The accessory gearbox 108 will in turn cause the intermediate-pressure compressor 106 to rotate, which facilitates starting of the gas turbine engine. The remaining steps required for the successful ignition of a gas turbine engine will be known to the person skilled in the art and are therefore not discussed in the present disclosure.

In addition to the input from the compressor 102, the first electrical machine 116, which operated in the blower mode as a generator, can be powered by the power management system 122 such that the first electrical machine 116 acts as a motor, in the starter mode. The mechanical power generated by the first electrical machine 116 can therefore be added to that provided by the compressor 102, both the compressor 102 and the first electrical machine 116 causing rotation of the accessory gearbox 108 and thus intermediate-pressure compressor 106. As such, the present embodiment both provides a variable speed compressor 102 and an electrically-assisted starting operation for a gas turbine engine.

The first electrical machine 116 may form part of a variable speed pumping system 200. The variable speed pumping machine 200 comprises the first electrical machine 116, where the first electrical machine 106 comprises an electrical machine rotor shaft 202 mechanically connected to the gas turbine engine 10 of the aircraft via the accessory gearbox 108. Electrical machine stator coils 204 are, in this example, arranged to at least partially surround a portion of the electrical machine rotor shaft 202 but will be understood this may not be the case in other electrical machine types and configurations within the scope of the present disclosure.

The electrical machine rotor shaft 202 and electrical machine stator coils 204 are configured such that rotation of the electrical machine rotor shaft using mechanical power from the engine allows for electrical power generation through the electrical machine stator coils 204. The electrical machine rotor shaft 202 and electrical machine stator coils 204 are also configured such that passing an electric current through the electrical machine stator coils 204 can cause rotation of the electrical machine rotor shaft 202.

The variable speed pumping machine 200 further comprises an electric pump moto-generator 206. The electric pump motor-generator 206 comprises an electric pump rotor shaft 208 mechanically connected to the electrical machine rotor shaft 202 via a one way drive arrangement 210. Electric pump stator coils 212 are, in this example, arranged to at least partially surround a portion of the electric pump rotor shaft 208 but will be understood this may not be the case in other electrical machine types and configurations within the scope of the present disclosure.

The electric pump rotor shaft 208 and electric pump stator coils 212 are configured such that rotation of the electrical machine rotor shaft using mechanical power from the electrical machine rotor shaft 202 allows for electrical power generation through the electric pump stator coils 212. The electric pump rotor shaft 208 and electric pump stator coils 212 are also configured such that passing an electric current through the electric pump stator coils 212 can cause rotation of the electric pump rotor shaft 208.

The electric pump rotor shaft 208 is mechanically connected to a fluid pumping system 214. In some embodiments, the fluid pumping system 214 is configured to pump fuel, hydraulic fluids, oil or coolants. The fluid pumping system 214 may be configured to pump any suitable fluid.

Figure 5:
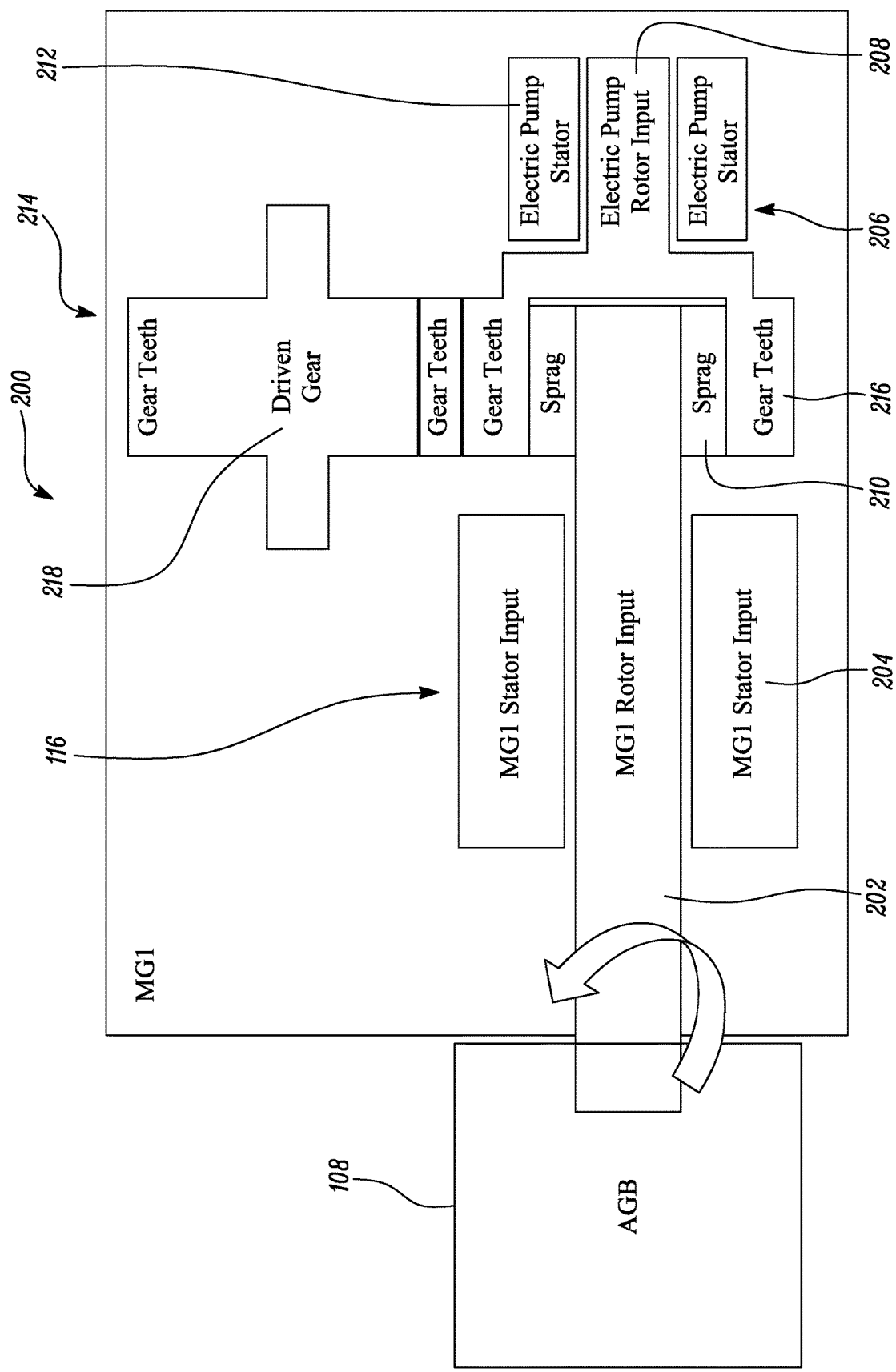
FIG. 5 is a schematic drawing of a variable speed pumping system.
Figure 6:
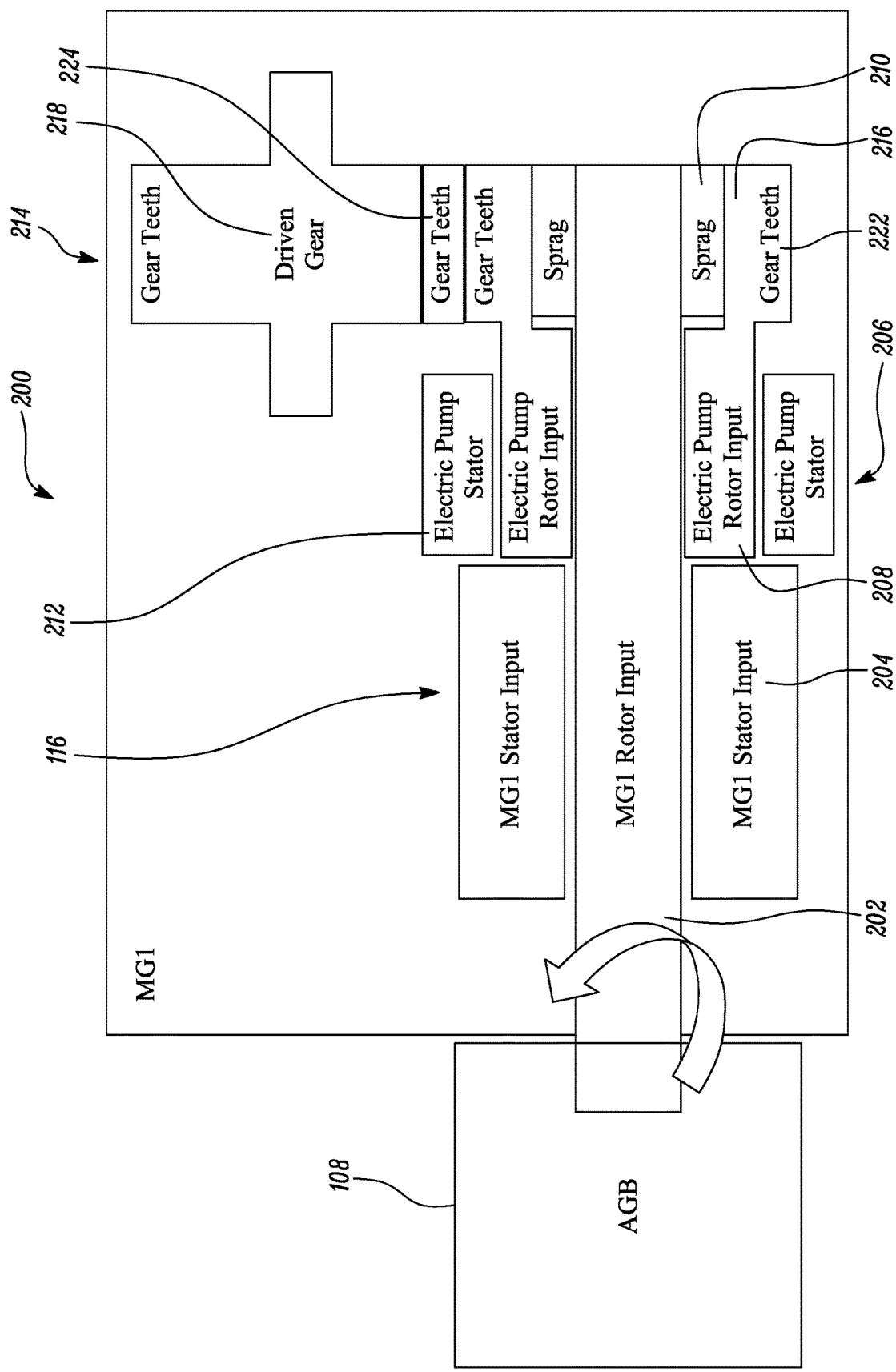
FIG. 6 is a schematic drawing of a variable speed pumping system.

In FIGS. 5 and 6, an embodiment where the fluid pumping system 214 comprises a geared pumping system 214 is shown. In other embodiments, the fluid pumping system 214 may comprise any suitable type of pump, for example, a gear pump, a vane pump, a gerotor pump, a centrifugal pump, or a piston pump.

In the embodiment shown in FIGS. 5 and 6, the electric pump rotor shaft 208 is mechanically connected to the fluid pumping system 214 via a geared arrangement. The electric pump rotor shaft 208 comprises a driver gear wheel 216 mechanically connected to a driven gear wheel 218. The driver gear wheel 216 and driven gear wheel 218 comprise cooperating gear teeth arranged to mesh together such that rotation of the driver gear wheel 216 causes rotation of the driven gear wheel 218. In this way, driver gear wheel teeth 222 are arranged to mesh together with driven gear wheel teeth 224 such that rotation of the driver gear wheel 216 causes rotation of the driven gear wheel 218.

The driver gear wheel 216 and driven gear wheel 218 may form part of a positive displacement gear pump assembly. The driven gear wheel 218 may be mechanically connected to a remote pumping system such that the driven gear wheel 218 is operable to provide mechanical power to the remote pumping system. As such, the driver gear wheel 216 and/or driven gear wheel 218 may directly form part of a pumping system or may be operable to provide mechanical power to a remote pumping system.

The one-way drive arrangement 210 is disposed between the electrical machine rotor shaft 202 and the driver gear wheel 216.

The one-way drive arrangement 210 is configured such that the electrical machine rotor shaft 202 and the electric pump rotor shaft 208 can rotate relative to each other in only one relative direction.

In FIGS. 5 and 6, a sprag clutch arrangement 210 is shown as an example of a one-way drive arrangement 210. In other embodiments, any suitable one-way drive arrangement may be used, for example, a ratchet and pawl arrangement. In this way, the one-way drive arrangement 210 is configured such that the electrical machine rotor shaft 202 can only drive the electric pump rotor shaft 208 in one direction.

FIG. 6 shows a different example embodiment of the variable speed pumping system 200.

In the example shown in FIG. 5, the electric pump rotor shaft 208 and the electric pump stator coils 212 are disposed substantially to a side of the first electrical machine 116.

In the example shown in FIG. 6, the electric pump rotor shaft 208 and the electric pump stator coils 212 are arranged to extend around the circumference of the electrical machine rotor shaft 202.

In both FIG. 5 and FIG. 6, the electrical machine rotor shaft 202 and the electric pump rotor shaft 208 are configured to rotate concentrically.

In use, the variable speed pumping machine 200 is configured to operate in at least three modes including; a first mode, a second mode and a third mode.

In a first mode, the electrical machine rotor shaft 202 is rotated using mechanical power received from the gas turbine engine 10. The electrical machine rotor shaft 202 is mechanically connected to the gas turbine engine 10 through the accessory gearbox 108. In other embodiments, the electrical machine rotor shaft is mechanically connected to the gas turbine engine 10 but not through the accessory gearbox 108. In other embodiments, the electrical machine rotor shaft 202 may be configured to receive mechanical power from the gas turbine engine 10 via any suitable arrangement.

Rotation of the electrical machine rotor shaft 202, using mechanical power from the gas turbine engine 10, mechanically drives rotation of the electric pump rotor shaft 208 via the one-way drive arrangement 210. Upon rotation of the electrical machine rotor shaft 202 the one-way drive arrangement 210 engages with the electric pump rotor shaft 208 such that the electric pump rotor shaft 208 rotates at the same speed as the electrical machine rotor shaft 202. As such, in the first mode the electrical machine rotor shaft 202 and the electric pump rotor shaft 208 are both driven by mechanical power from the gas turbine engine 10.

Rotation of the electrical machine rotor shaft 202, using mechanical power from the gas turbine engine 10, allows for electrical power generation through the electrical machine stator coils 204. In this way, in the first mode, the first electrical machine 116 is configured to operate as a generator. The electrical power generated by the first electrical machine 116 is transmitted to the power management system 122. In some embodiments, electrical power generated by the first electrical machine 116 may be transferred to any other suitable power management system or electrical energy storage device.

Rotation of the electric pump rotor shaft 208, driven mechanically by the electrical machine rotor shaft 202 via the one-way drive arrangement 210, allows for electrical power generation through the electric pump stator coils 214 in the first mode. In this way, in the first mode, the electric pump motor-generator 206 is configured to operate as a generator. The electrical power generated by the electric pump motor-generator 206 is transmitted to the power management system 122. In some embodiments, electrical power generated by the electric pump motor-generator 206 may be transferred to any other suitable power management system or electrical energy storage device.

In the first mode, electrical power generated by the first electrical machine 116 and the electric pump motor-generator 206 and transmitted to the power management system 122 may be used to electrically power the second electrical machine 120 when present.

Rotation of the electric pump rotor shaft 208 by the electrical machine rotor shaft 202 via the one-way drive arrangement drives a fluid pumping system 214. In the first mode, the speed of the electric pump rotor shaft 208 is dictated by the speed of the electrical machine rotor shaft 202. As such, in the first mode, the first electric machine 116 and the electric pump motor-generator 206 are both be operated as generators.

In a second mode, the electrical machine rotor shaft 202 may be mechanically rotated by power received from the gas turbine engine 10 in the same way as in the first mode.

Similarly to the first mode, rotation of the electrical machine rotor shaft 202 driven by the engine 10 allow for electrical power generation through the electrical machine stator coils 204. In this way, in the second mode, the first electrical machine 116 is configured to operate as a generator. The electrical power generated by the first electrical machine 116 is transmitted to the power management system 122.

In the second mode, the electric pump motor-generator 206 is operated as a motor. Electrical power from the power management system 122 is transmitted to the electric pump stator coils 214 in order to operate the electric pump motor-generator 206 as a motor and not a generator.

When operating as a motor in the second mode, the electric pump motor-generator 206 is operable to cause the electric pump rotor shaft 208 to overrun the first electric machine rotor shaft 202 and therefore rotate faster than the first electric machine rotor shaft 202. In this way, in the second mode the electric pump rotor shaft 208 is rotated and drives the fluid pumping system 214, using electrical power. As such, the electric pump rotor shaft 208 is operable to rotate at a speed that is not limited by the speed of rotation of the electrical machine rotor shaft 202. The fluid pumping system 214 may therefore be driven using electrical power to meet demand where the electrical machine rotor shaft 202 is not rotating fast enough to meet said demand.

In a third mode, the electrical machine rotor shaft 202 is driven electrically. The third mode may be used during starting or barring modes of the gas turbine engine 10. The electric motor stator coils 204 receive power from the power management system 122 which causes the first electrical machine 116 to operate as a motor. The electrical machine rotor shaft 202, in the third mode, may be used as the prime mover to turn the accessory gearbox 108.

In the third mode, the electric pump motor-generator 206 is configured to also operate as a motor. Electrical power from the power management system 122 is transmitted to the electric pump stator coils 212 in order to operate the electric pump motor-generator 206 as a motor.

When operating as a motor, the electric pump motor-generator 206 is operable to cause the electric pump rotor shaft 208 to overrun the first electric machine rotor shaft 202, similarly to the second mode, and therefore rotate faster than the first electric machine rotor shaft 202. In the third mode, the electric pump rotor shaft 208 is rotated using electrical power from the power management system 112 drives the fluid pumping system 214 at a speed that is not limited by the speed of rotation of the electrical machine rotor shaft 202.

In the third mode, the first electric machine 116 and electric pump motor-generator 206 are both configured to operate as motors and both the electric machine rotor shaft 202 and electric pump rotor shaft 208 are electrically driven.

The variable speed pumping system 200 is operable to switch between the first mode, the second mode and/or the third mode. The variable speed pumping system 200 may be controlled by an electronic controller or the like. The electronic controller may form part of the variable speed pumping system 200 or may be part of a wider aircraft system.

Figure 7:
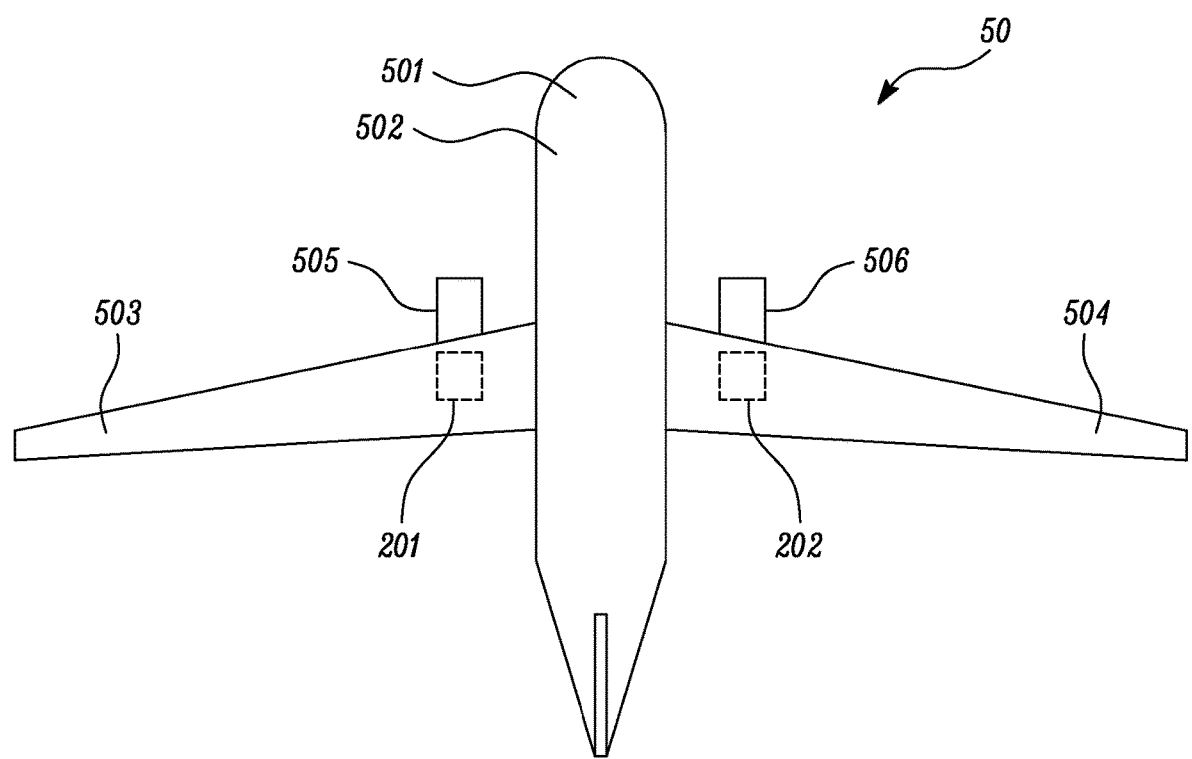
FIG. 7 is an aircraft including two gas turbine engines and two associated variable speed pumping systems.

FIG. 7 shows schematically an aircraft 50. The aircraft 50 has a fuselage 501 with a cabin 502 therein. A first wing 503 and a second wing 504 extend away from the fuselage 501 in opposite directions. A first gas turbine engine 505 is connected to the first wing 504. A second gas turbine engine 506 is connected to the second wing 505. The first gas turbine engine 505 and/or the second gas turbine engine 506 may be any gas turbine engine for an aircraft. For example, the first gas turbine engine 505 and/or the second gas turbine engine 506 may be similar to or the same as the gas turbine engine 10 disclosed herein.

A first variable speed pumping system 200a according to the present disclosure is associated with the first gas turbine engine 505. A second variable speed pumping system 20b according to the present disclosure is associated with the second gas turbine engine 506.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A blower system for supplying air to an aircraft system, comprising:
   an air compressor for compressing air for delivery to an aircraft system; and
   a transmission having an input mechanically couplable with a gas turbine engine spool and an output mechanically coupled with the air compressor,
   wherein the transmission comprises a variable speed pumping system comprising:
      a first electrical machine comprising an electrical machine rotor shaft mechanically couplable to the spool of the gas turbine engine and electrical machine stator coils, the first electrical machine being a motor-generator; and
      an electric pump motor-generator comprising an electric pump rotor shaft mechanically connected to the electrical machine rotor shaft via a one way drive arrangement and electric pump stator coils,
   wherein the electric pump rotor shaft is mechanically connected to a fluid pumping system, and
   wherein the air compressor is distinct from the fluid pumping system.

2. The blower system according to claim 1, wherein in a first mode, the first electrical machine is configured to operate as a generator and the electric pump motor-generator is configured to operate as a generator, the electrical machine rotor shaft being mechanically rotated by power received from an engine to allow for electrical power generation through the electrical machine stator coils, and the electrical machine rotor shaft driving rotation of the electric pump rotor shaft via the one way drive arrangement to allow for electrical power generation through the electric pump stator coils.

3. The blower system according to claim 2, wherein, in a second mode, the first electrical machine is configured to operate as the generator and the electric pump motor-generator is configured to operate as the motor, the electrical machine rotor shaft being mechanically rotated by power received from the engine to allow for electrical power generation through the electrical machine stator coils and the electric pump rotor shaft being driven electrically via the electric pump rotor shaft.

4. The blower system according to claim 3, wherein when operating as the motor in the second mode, the electric pump motor-generator is operable to cause the electric pump rotor shaft to overrun the electrical machine rotor shaft and therefore rotate faster than the electrical machine rotor shaft.

5. The blower system according to claim 3, wherein, in the second mode, the electric pump stator coils provide variable speed control of the electric pump rotor shaft.

6. The blower system according to claim 3, wherein, in a third mode, the first electrical machine is configured to operate as the motor and the electric pump motor-generator is also configured to operate as the motor.

7. The blower system according to claim 6, wherein, when operating as a motor in the third mode, the electric pump motor-generator is operable to cause the electric pump rotor shaft to overrun the electrical machine rotor shaft and therefore rotate faster than the electrical machine rotor shaft.

8. The blower system according to claim 6, wherein, in the third mode, the electric pump stator coils provide variable speed control of the electric pump rotor shaft.

9. The blower system according to claim 1, further comprising a power management system operable to transfer electrical power to or receive electrical power from the electrical machine stator coils of the first electrical machine and the electric pump stator coils of the electric pump motor-generator.

10. The blower system according to claim 1, wherein the fluid pumping system is one of a fuel pumping system, a hydraulic fluid pumping system, a lubricant pumping system or a coolant pumping system.

11. The blower system according to claim 1, wherein the transmission is configured to receive mechanical power from the gas turbine engine spool in the form of a first transmission input, and the transmission further comprises:
an electrical circuit comprising the first electrical machine;
a second electrical machine; and
a power management system,
wherein, when operating in a blower mode, the first electrical machine is configured to receive mechanical power from the gas turbine engine spool and act as a generator to provide electrical power to the power management system, and the second electrical machine is configured to act as a motor providing mechanical power to the transmission in the form of a second transmission input, the second electrical machine being driven by electrical power from the power management system.

12. A gas turbine engine comprising the blower system according to claim 1.

13. An aircraft comprising the blower system according to claim 1.

* * * * *